US012488036B2

(12) United States Patent
Liu et al.

(10) Patent No.: US 12,488,036 B2
(45) Date of Patent: Dec. 2, 2025

(54) AUTOMATICALLY GENERATING A SUMMARY OF OBJECTS BEING SHARED

(71) Applicant: Dropbox, Inc., San Francisco, CA (US)

(72) Inventors: Xintong Liu, Sunnyvale, CA (US); Hao Li, San Mateo, CA (US); Salvador Martinez, Yukon, OK (US)

(73) Assignee: Dropbox, Inc., San Francisco, CA (US)

( * ) Notice: Subject to any disclaimer, the term of this patent is extended or adjusted under 35 U.S.C. 154(b) by 108 days.

(21) Appl. No.: 18/526,104

(22) Filed: Dec. 1, 2023

(65) Prior Publication Data

US 2025/0181626 A1  Jun. 5, 2025

(51) Int. Cl.
| | |
|---|---|
| *G06F 16/34* | (2025.01) |
| *G06F 21/62* | (2013.01) |
| *G06F 40/186* | (2020.01) |
| *H04L 51/02* | (2022.01) |

(52) U.S. Cl.
CPC ........ *G06F 16/345* (2019.01); *G06F 21/6209* (2013.01); *G06F 40/186* (2020.01); *H04L 51/02* (2013.01)

(58) Field of Classification Search
CPC .................................................. G06F 16/345
USPC .............................................................. 715/254
See application file for complete search history.

(56) References Cited

U.S. PATENT DOCUMENTS

| | | | | |
|---|---|---|---|---|
| 12,118,513 | B1 * | 10/2024 | Lu | G06F 40/40 |
| 2005/0052685 | A1 * | 3/2005 | Herf | H04N 1/32776 |
| | | | | 358/1.15 |
| 2017/0169853 | A1 * | 6/2017 | Hu | G11B 27/031 |
| 2019/0206385 | A1 * | 7/2019 | Avital | G06F 40/20 |
| 2019/0333611 | A1 * | 10/2019 | Brown | G06N 5/045 |
| 2022/0236843 | A1 * | 7/2022 | Wilde | G06F 3/0481 |
| 2022/0300711 | A1 * | 9/2022 | Elisco | G06F 16/93 |
| 2022/0382728 | A1 * | 12/2022 | Religa | G06N 20/20 |

(Continued)

FOREIGN PATENT DOCUMENTS

| | | |
|---|---|---|
| CN | 116595978 A | 8/2023 |
| CN | 116894089 A | 10/2023 |
| IN | 202321033433 A | 9/2023 |

OTHER PUBLICATIONS

Das S., et al., "Driving the Technology Value Stream by Analyzing App Reviews," IEEE Transactions on Software Engineering, Apr. 26, 2023, vol. 49, No. 7, pp. 3753-3770, Retrieved from the Internet: URL: https://ieeexplore.ieee.org/iel7/32/4359463/10109144.pdf.

(Continued)

*Primary Examiner* — Reza Nabi
(74) *Attorney, Agent, or Firm* — Polsinelli PC

(57) ABSTRACT

The present technology addresses a need in the art for providing additional context to a recipient receiving a shared object(s). Sharing messages are generally limited to a brief statement indicating that a user account has shared the object(s). The present technology can automatically create a summary for an object(s) to be shared. Moreover, the present technology provides a user interface that is part of a sharing process for the creation of the summary so that the creation of the summary is very convenient for the user, and can even be completely automatic. Additionally, the present technology includes carefully engineered prompts that result in summaries that are appropriate for the sharing context in which they are intended.

15 Claims, 12 Drawing Sheets

(56) References Cited

U.S. PATENT DOCUMENTS

| | | | | |
|---|---|---|---|---|
| 2022/0405819 | A1* | 12/2022 | Carlson | G06F 40/40 |
| 2023/0016576 | A1* | 1/2023 | Wilde | G06F 3/0484 |
| 2023/0146979 | A1* | 5/2023 | Gunasekara | G06F 40/205 |
| | | | | 704/9 |
| 2023/0315999 | A1* | 10/2023 | Mohammed | G06F 16/345 |
| | | | | 704/9 |
| 2023/0321548 | A1* | 10/2023 | Vogel | A63F 13/67 |
| | | | | 463/42 |
| 2024/0029848 | A1* | 1/2024 | Gupta | G16H 15/00 |
| 2024/0256622 | A1* | 8/2024 | Abrams | G06F 16/9538 |
| 2024/0273793 | A1* | 8/2024 | DeCharms | G09B 5/06 |
| 2024/0430364 | A1* | 12/2024 | Breedvelt | G06Q 10/101 |
| 2025/0139382 | A1* | 5/2025 | Mohammed | G06F 40/40 |
| 2025/0181626 | A1* | 6/2025 | Liu | G06F 40/186 |
| 2025/0217399 | A1* | 7/2025 | Mauritz | G06F 3/0482 |
| 2025/0217572 | A1* | 7/2025 | DeCharms | G06F 40/197 |

OTHER PUBLICATIONS

Yim W-W., et al., "Aci-bench: a Novel Ambient Clinical Intelligence Dataset for Benchmarking Automatic Visit Note Generation," Scientific Data, Sep. 6, 2023, vol. 10(1):586, 16 pages, Retrieved from the Internet: URL: https://www.nature.com/articles/s41597-023-02487-3.pdf.

* cited by examiner

AUTOMATICALLY GENERATING A SUMMARY OF OBJECTS BEING SHARED

BACKGROUND

Sharing of objects, such as files, is a common practice that facilitates collaboration and information sharing. Generally, when an object is shared, a sharing user account selects an object to be shared and identifies a recipient of the sharing by identifying the recipient based on their user account identifier or contact information. The sharing user account can also define the permissions the recipient has to view, edit, access, or share the object. Once the object(s) to be shared has been identified and the permissions defined, a message can be sent to the recipient informing the recipient of their access to the shared object(s).

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
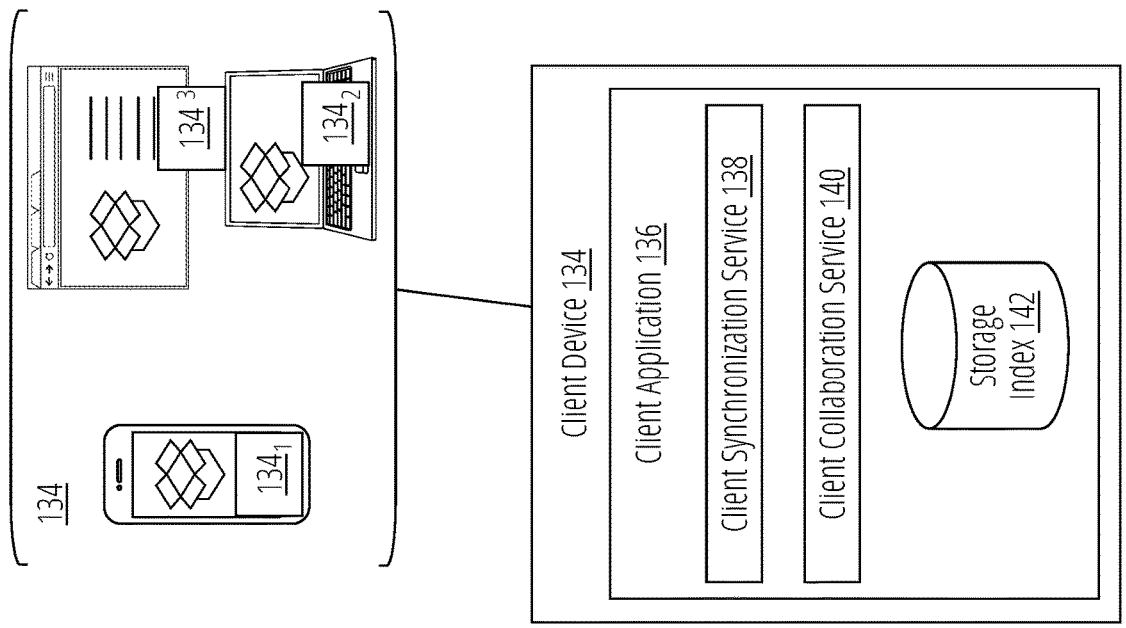
FIG. 1 illustrates an example of a content management system and client devices in accordance with some aspects of the present technology.
Figure 1:
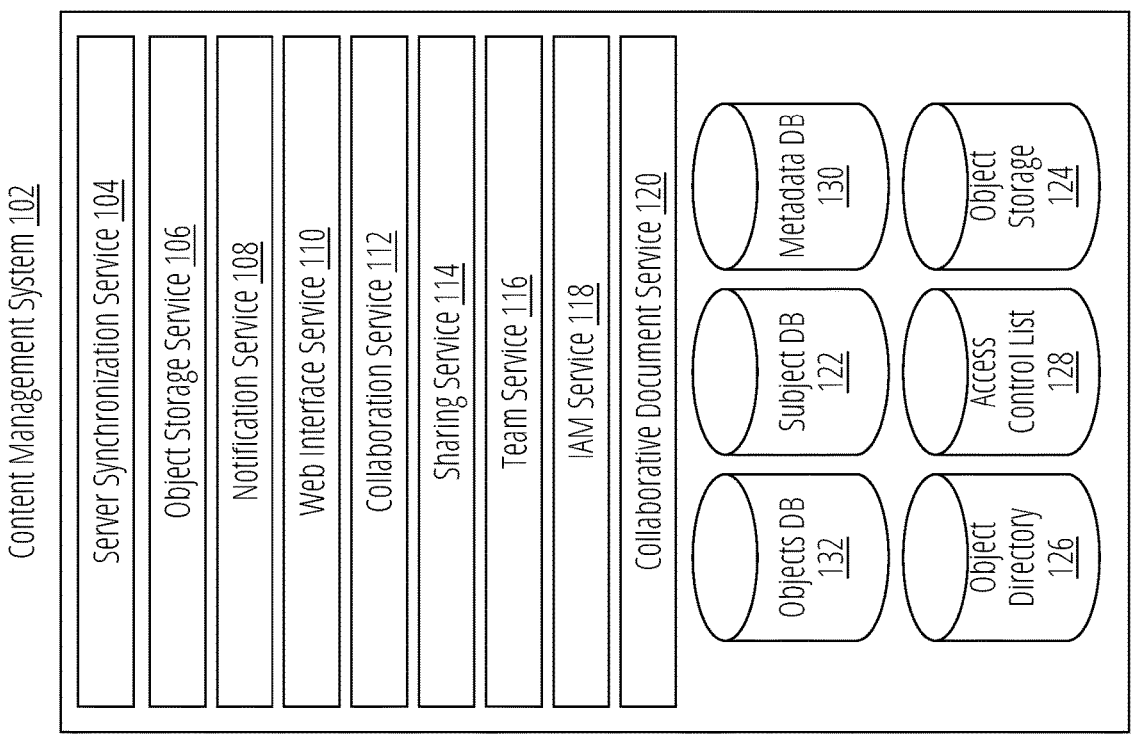

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present technology addresses a need in the art for providing additional context to a recipient receiving a shared object(s). Sharing of objects, such as files, is a common practice that facilitates collaboration and information sharing. Generally, when an object is shared, a sharing user account selects an object to be shared and identifies a recipient of the sharing by identifying the recipient based on their user account identifier or contact information. The sharing user account can also define the permissions the recipient has to view, edit, access, or share the object. Once the object(s) to be shared has been identified and the permissions defined, a message can be sent to the recipient informing the recipient of their access to the shared object(s).

Unfortunately, these messages are generally limited to a brief statement indicating that a user account has shared the object(s). Too often, the recipient user has little context for what object has been shared and might even ignore the sharing notification if the recipient does not appreciate the context for the sharing and does not appreciate what has been shared. Accordingly, there is a need in the art to provide a recipient of a shared object with a summary of the object(s) that has been shared.

But user accounts sharing objects do not generally provide a summary because conceiving a summary takes effort and time. The present technology can automatically create a summary for an object(s) to be shared. Moreover, the present technology provides a user interface that is part of a sharing process for the creation of the summary so that the creation of the summary is very convenient for the user, and can even be completely automatic.

The user interface innovations that are part of the present technology provide benefits to the computing system, too. Whereas generally, a user that might want to create a summary might need to select objects for sharing, send them to a summary generation service, such as a generative large language model, and then copy the summary into an interface of a sharing service, the present technology can avoid the bandwidth and resources in rendering multiple webpages and logging into multiple services. Instead, a sharing UI can handle the interaction with the summary generation service, including providing access to the documents to be summarized to the summary generation service and providing the summary into the sharing interface provided by the sharing service.

Additionally, the present technology includes carefully engineered prompts that result in summaries that are appropriate for the sharing context in which they are intended. These prompts reduce the need for follow-up prompts requesting revisions of the generated summary. Each prompt made to the summary generation service can result in a lot of computing resources being consumed by the summary generation service, especially, when the summary generation service utilizes a generative large language model to generate the summaries. Therefore, the present technology makes the summary generation service more efficient by providing carefully engineered prompts that are designed to result in less calls to the summary generation service.

Even the concept of causing the summary generation to occur when the objects are shared provides particular benefits. For example, if the sharing user account creates the summary, the summary only needs to be created once, whereas if summary generation were left to the recipients of at least one object to be shared, many more calls to the summary generation service could be expected as multiple recipients might request a summary. Additionally, placing the summary generation service with the sharing user account allows the sharing user account to review the summary, if desired, to ensure the summary is accurate. As generative large language models are prone to hallucination, it can be beneficial to have the sharing user account create the summary since they are more likely to know the contents of the object(s) being shared than the recipient.

These and other advantages are enabled by the present technology and will be addressed further herein.

In some embodiments, the disclosed technology is deployed in the context of a content management system having object synchronization capabilities and collaboration features, among others. An example system 100 configuration is shown in FIG. 1, which depicts content management system 102 interacting with client device 134.

Accounts

Content management system 102 can store objects in association with accounts, as well as perform a variety of object management tasks, such as retrieve, modify, browse, and/or share the object(s). Furthermore, content management system 102 can enable an account to access object(s) from multiple client devices.

Content management system 102 supports a plurality of accounts. A subject (user, group, team, company, etc.) can create an account with content management system, and account details can be stored in subject database 122. Subject database 122 can identify a registered subject by a subject ID, and store profile information for registered subjects in association with the subject ID. In some cases, profile information for registered subjects includes a subject name and/or email address. Subject database 122 can include account management information, such as account type (e.g. various tiers of free or paid accounts), storage space allocated, storage space used, client devices 134 having a registered content management client application 136 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subject database 122 need not store complete information associated with an account for a subject. Some portion of information associated with an account for a subject can also be stored in another database of content management system 102 such as metadata database 130, or in a database external to content management system 102.

Subject database 122 can store groups of accounts associated with a subject. Groups can have permissions based on group permissions statements and/or access control lists, and members of the groups can inherit the permissions. For example, a marketing group can have access to one set of objects while an engineering group can have access to another set of objects. An administrator group can modify groups, modify subject accounts, etc. Groups are also subjects identified by subject ID.

In some embodiments, subject database 122 can be broken into a plurality of tables, indexes and other data structures.

Object Storage

A feature of content management system 102 is the storage of objects, which can be stored in object storage 124. An object generally is any entity that can be recorded in a file system. Objects can be any object including digital data such as documents, collaboration objects, text files, audio files, image files, video files, webpages, executable files, binary files, object directories, folders, zip files, playlists, albums, symlinks, cloud docs, mounts, placeholder objects referencing other objects in content management system 102 or in other content management systems, etc.

In some embodiments, objects can be grouped into a collection, which can refer to a folder including a plurality of objects, or a plurality of objects that are related or grouped by a common attribute.

In some embodiments, object storage 124 is combined with other types of storage or databases to handle specific functions. Object storage 124 can store objects, while metadata regarding the objects can be stored in metadata database 130. Likewise, data regarding where an object is stored in object storage 124 can be stored in object directory 126. Additionally, data regarding changes, access, etc. can be stored in objects database 132. Objects database 132 can also include a subject account identifier that identifies the subject IDs that have access to the object.

In some embodiments, objects database 132 can be broken into a plurality of tables, indexes and other data structures.

Each of the various storages/databases such as object storage 124, object directory 126, objects database 132, and metadata database 130 can be comprised of more than one such storage or database and can be distributed over many devices and locations. Other configurations are also possible. For example, data from object storage 124, object directory 126, objects database 132, and/or metadata database 130 may be combined into one or more object storages or databases or further segmented into additional object storages or databases. Thus, content management system 102 may include more or less storages and/or databases than shown in FIG. 1.

In some embodiments, object storage 124 is associated with at least one object storage service 106, which includes software or other processor executable instructions for managing the storage of objects including, but not limited to, receiving objects for storage, preparing objects for storage, selecting a storage location for the object, retrieving objects from storage, etc. In some embodiments, object storage service 106 can divide an object into smaller chunks for storage at object storage 124. The location of each chunk making up an object can be recorded in object directory 126. Object directory 126 can include a content entry for each object stored in object storage 124. The content entry can be associated with an object ID, which uniquely identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object, but will output a different hash for a different object. Using this methodology, object storage service 106 can output a unique hash for each different version of an object.

Object storage service 106 can also designate or record a parent of an object or a content path for an object in objects database 132. The content path can include the name of the object and/or folder hierarchy associated with the object. For example, the content path can include a folder or path of folders in which the object is stored in a local file system on a client device. In some embodiments, object database might only store a direct ancestor or direct child of any object, which allows a full path for an object to be derived, and can be more efficient than storing the whole path for an object.

While objects are stored in object storage 124 in blocks and may not be stored under a tree like directory structure, such directory structure is a comfortable navigation structure for subjects viewing objects. Object storage service 106 can define or record a content path for an object wherein the "root" node of a directory structure can be any directory with specific access privileges assigned to it, as opposed to a directory that inherits access privileges from another directory.

In some embodiments a root directory can be mounted underneath another root directory to give the appearance of a single directory structure. This can occur when an account has access to a plurality of root directories. As addressed above, the directory structure is merely a comfortable navigation structure for subjects viewing objects but does not correlate to storage locations of objects in object storage 124.

While the directory structure in which an account views objects does not correlate to storage locations of the objects at content management system 102, the directory structure can correlate to storage locations of the objects on client device 134, depending on the file system used by client device 134.

As addressed above, a content entry in object directory 126 can also include the location of each chunk making up an object. More specifically, the content entry can include content pointers that identify the location in object storage 124 of the chunks that make up the object.

Object storage service 106 can decrease the amount of storage space required by identifying duplicate objects or duplicate blocks that make up an object or versions of an object. Instead of storing multiple copies, object storage 124 can store a single copy of the object or block of the object, and object directory 126 can include a pointer or other mechanism to link the duplicates to the single copy.

Object storage service 106 can also store metadata describing objects, object types, folders, file path, and/or the relationship of objects to various accounts, collections, or groups in metadata database 130, in association with the object ID of the object.

Object storage service 106 can also store a log of data regarding changes, access, etc. in objects database 132. Objects database 132 can include the object ID of the object and can optionally include a description of the change or access action along with a time stamp or version number and any other relevant data. Objects database 132 can also include pointers to blocks affected by the change or object access. Object storage service 106 can also provide the ability to undo operations, by using an object version control mechanism that tracks changes to objects, different versions of objects (including diverging version trees), and a change history that can be acquired from objects database 132.

Object Synchronization

Another feature of content management system 102 is synchronization of objects with at least one client device 134. Client device(s) 134 can take different forms and have different capabilities. For example, client device 134 can be a computing device having a local file system accessible by multiple applications resident thereon. Client device 134 can be a computing device wherein objects are only accessible to a specific application or by permission given by the specific application, and the objects are typically stored either in an application specific space or in the cloud. Client device 134 can be any client device accessing content management system 102 via a web browser and accessing objects via a web interface. While example client device 134 is depicted in form factors such as a laptop, mobile device, or web browser, it should be understood that the descriptions thereof are not limited to devices of these example form factors. For example a mobile device might have a local file system accessible by multiple applications resident thereon, or might access content management system 102 via a web browser. As such, the form factor should not be considered limiting when considering client 134's capabilities. One or more functions described herein with respect to client device 134 may or may not be available on every client device depending on the specific capabilities of the device—the file access model being one such capability.

In many embodiments, client devices 134 are associated with an account of content management system 102, but in some embodiments client devices 134 can access content using shared links and do not require an account.

As noted above, some client devices can access content management system 102 using a web browser. However, client devices can also access content management system 102 using client application 136 stored and running on client device 134. Client application 136 can include a client synchronization service 138.

Client synchronization service 138 can be in communication with server synchronization service 104 to synchronize changes to objects between client device 134 and content management system 102.

Client device 134 can synchronize content with content management system 102 via client synchronization service 138. The synchronization can be platform agnostic. That is, content can be synchronized across multiple client devices of varying types, capabilities, operating systems, etc. Client synchronization service 138 can synchronize any changes (e.g., new, deleted, modified, copied, or moved objects) to objects in a designated location of a file system of client device 134.

Objects can be synchronized from client device 134 to content management system 102, and vice versa. In embodiments wherein synchronization is from client device 134 to content management system 102, a subject can manipulate objects directly from the file system of client device 134, while client synchronization service 138 can monitor directory on client device 134 for changes to files within the monitored folders.

When client synchronization service 138 detects a write, move, copy, or delete of content in a directory that it monitors, client synchronization service 138 can synchronize the changes to content management storage service 106. In some embodiments, client synchronization service 138 can perform some functions of content management storage service 106 including functions addressed above such as dividing the object into blocks, hashing the object to generate a unique identifier, etc. Client synchronization service 138 can index content within client storage index 142 and save the result in client storage index 142. Indexing can include storing paths plus the object identifier, and a unique identifier for each object. In some embodiments, client synchronization service 138 learns the object identifier from server synchronization service 104, and learns the unique client identifier from the operating system of client device 134.

Client synchronization service 138 can use storage index 142 to facilitate the synchronization of at least a portion of the objects within client storage with objects associated with a subject account on content management system 102. For example, client synchronization service 138 can compare storage index 142 with content management system 102 and detect differences between content on client storage and content associated with a subject account on content management system 102. Client synchronization service 138 can then attempt to reconcile differences by uploading, downloading, modifying, and deleting content on client storage as appropriate. Object storage service 106 can store the changed or new block for the object and update objects database 132, metadata database 130, object directory 126, object storage 124, subject database 122, etc. as appropriate.

When synchronizing from content management system 102 to client device 134, data regarding a mount, modification, addition, deletion, move of an object recorded in objects database 132 can trigger a notification to be sent to client device 134 using notification service 108. When client device 134 is informed of the change, client device 134 can make a request for changes listed in objects database 132 since the last synchronization point known to the client device. When client device 134 determines that it is out of synchronization with content management system 102, client synchronization service 138 requests object blocks including the changes, and updates its local copy of the changed objects.

In some embodiments, storage index 142 stores tree data structures wherein one tree reflects the latest representation of a directory according to server synchronization service 104, while another tree reflects the latest representation of the directory according to client synchronization service 138. Client synchronization service can work to ensure that the tree structures match by requesting data from server synchronization service 104 or committing changes on client device 134 to content management system 102.

Sometimes client device 134 might not have a network connection available. In this scenario, client synchronization service 138 can monitor the linked collection for object changes and queue those changes for later synchronization to content management system 102 when a network connection is available. Similarly, a subject can manually start, stop, pause, or resume synchronization with content management system 102.

Client synchronization service 138 can synchronize all content associated with a particular subject account on content management system 102. Alternatively, client synchronization service 138 can selectively synchronize some of the objects associated with the particular subject account on content management system 102. Selectively synchronizing only some of the objects can preserve space on client device 134 and save bandwidth.

In some embodiments, client synchronization service 138 selectively stores a portion of the objects associated with the particular subject account and stores placeholder objects in client storage for the remainder portion of the objects. For example, client synchronization service 138 can store a placeholder object that has the same filename, path, extension, metadata, of its respective complete object on content management system 102, but lacking the data of the complete object. The placeholder object can be a few bytes or less in size while the respective complete object might be significantly larger. After client device 134 attempts to access the object, client synchronization service 138 can retrieve the data of the object from content management system 102 and provide the complete object to client device 134. This approach can provide significant space and bandwidth savings while still providing full access to a subject's objects on content management system 102.

While the synchronization embodiments addressed above referred to client device 134 and a server of content management system 102, it should be appreciated by those of ordinary skill in the art that a user account can have any number of client devices 134 all synchronizing objects with content management system 102, such that changes to an object on any one client device 134 can propagate to other client devices 134 through their respective synchronization with content management system 102.

Collaboration Features

Another feature of content management system 102 is to facilitate collaboration between subjects. Collaboration features include object sharing, commenting on objects, co-working on objects in real time, instant messaging, providing presence and "seen" state information regarding objects, etc.

Sharing

Content management system 102 can manage sharing objects via sharing service 114. Sharing an object by providing a link to the object can include making the object accessible from any computing device in network communication with content management system 102. However, in some embodiments a link can be associated with access restrictions enforced by content management system 102 and Identity and Access Management (IAM) service 118. Sharing content can also include linking content using sharing service 114 to share content within content management system 102 with at least one additional subject account (in addition to the original subject account associated with the object) so that each subject account has access to the object. The additional subject account can gain access to the content by accepting the content, which will then be accessible through either web interface service 110 or directly from within the directory structure associated with their account on client device 134. The sharing can be performed in a platform agnostic manner. That is, the content can be shared across multiple client devices 134 of varying type, capabilities, operating systems, etc. The content can also be shared across varying types of subject accounts.

To share an object within content management system 102 sharing service 114 can add associate a subject ID of a team or of one or more subject accounts with a content item in objects database 132 associated with the object, thus granting the added subject account(s) access to the object. Sharing service 114 can also remove subject IDs from being permitted to access a content item in objects database 132 to restrict a subject account's access to the object. Sharing service 114 can record object identifiers, subject identifiers given access to an object, and access levels in objects database 132. For example, in some embodiments, subject identifiers associated with a single content item can specify different permissions for respective subject identifiers with respect to the associated object.

In some embodiments, content management system 102 can include an access control list 128 which includes a description of complete access rights pertaining to a respective object. An access control list for any respective object in content management system can be derived from objects database 132. In some embodiments, it is not desirable to maintain a persistent access control list 128 for a respective object, as an access control list 128 for a respective object can be derived when needed. In some embodiments, objects can inherit access rights from another object such as ancestor objects.

To share objects outside of content management system 102, sharing service 114 can generate a custom network address, such as a uniform resource locator (URL), which allows any web browser to access the object or collection in content management system 102 without any authentication. To accomplish this, sharing service 114 can include content identification data in the generated URL, which can later be used to properly identify and return the requested object. For example, sharing service 114 can include a token identifying an object ID and optionally a subject ID in the generated URL. Upon selection of the URL, the content identification data included in the URL can be transmitted to content management system 102, which can use the received content identification data to identify the appropriate object and return the object.

In addition to generating the URL, sharing service 114 can also be configured to record in objects database 132 that a URL to the object has been created. In some embodiments, an entry into objects database 132 associated with an object can include a URL flag indicating whether a URL to the object has been created. For example, the URL flag can be a Boolean value initially set to 0 or false to indicate that a URL to the object has not been created. Sharing service 114 can change the value of the flag to 1 or true after generating a URL to the object.

In some embodiments, sharing service 114 can associate a set of permissions to a URL for an object. For example, if a subject attempts to access the object via the URL, sharing service 114 can provide a limited set of permissions for the object. Examples of limited permissions include restrictions that the subject cannot download the object, save the object, copy the object, modify the object, etc. In some embodiments, limited permissions include restrictions that only permit an object to be accessed from with a specified domain, i.e., from within a corporate network domain, or by accounts associated with a specified domain, e.g., accounts associated with a company account (e.g., @acme.com).

In some embodiments, sharing service 114 can also be configured to deactivate a generated URL. For example, each entry into objects database 132 can also include a URL active flag indicating whether the content should be returned in response to a request from the generated URL. For example, sharing service 114 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 114 can reactivate the URL by again changing the value of the URL active flag to 1 or true. A subject can thus easily restore access to the object without the need to generate a new URL.

In some embodiments, content management system 102 can designate a URL for uploading an object. For example, a first subject with a subject account can request such a URL, provide the URL to a contributing subject and the contributing subject can upload an object to the first subject's subject account using the URL.

Team Service

In some embodiments content management system 102 includes team service 116. Team service 116 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Team service 116 can provide a common shared space for the team, private subject account folders, and access limited shared folders. Team service 116 can also provide a management interface for an administrator to manage collections and objects within team, and can manage subject accounts that are associated with the team. Teams, sub-teams, subject accounts are all given a subject identifier in subject database 122, and the membership to teams by subject accounts is also recorded in subject database 122.

IAM (Identity and Access Management) Service

In some embodiments, content management system 102 includes IAM service 118. IAM service 118 can authenticate a subject account. For subject accounts with multiple levels of rights (e.g. a subject account with subject rights and administrator rights) IAM service 118 can also facilitate explicit privilege escalation to avoid unintentional actions by administrators.

Object Access

Object storage service 106 can receive a token from client application 136 that follows a request to access an object and can return the capabilities permitted to the subject account.

Presence and Seen State

In some embodiments, content management system can provide information about how subjects with which an object is shared are interacting or have interacted with the object. In some embodiments, content management system 102 can report that a subject with which an object is shared is currently viewing the object. For example, client collaboration service 140 can notify notification service 108 when client device 134 is accessing the object. Notifications service 108 can then notify all client devices of other subjects having access to the same object of the presence of the subject of client device 134 with respect to the object.

In some embodiments, content management system 102 can report a history of subject interaction with a shared object. Collaboration service 112 can query data sources such as metadata database 130 and objects database 132 to determine that a subject has saved the object, that a subject has yet to view the object, etc., and disseminate this status information using notification service 108 to other subjects so that they can know who currently is or has viewed or modified the object.

Collaboration service 112 can facilitate comments associated with content, even if an object does not natively support commenting functionality. Such comments can be stored in metadata database 130.

Collaboration service 112 can originate and transmit notifications for subjects. For example, a subject can mention another subject in a comment and collaboration service 112 can send a notification to that subject letting them know that they have been mentioned in the comment. Various other object events can trigger notifications, including deleting an object, sharing an object, etc.

Collaboration service 112 can also provide a messaging platform whereby subjects can send and receive instant messages, voice calls, emails, etc.

Collaboration Objects

In some embodiments content management service can also include collaborative document service 120 which can provide an interactive object collaboration platform whereby subjects can simultaneously create collaboration objects, comment in the collaboration objects, and manage tasks within the collaboration objects. Collaboration objects can be files that subjects can create and edit using a collaboration object editor, and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments this can be managed by requiring two subjects access an object through a web interface and there they can work on the same copy of the object at the same time.

Collaboration Companion Interface

In some embodiments client collaboration service 140 can provide a native application companion interface for the purpose of displaying information relevant to an object being presented on client device 134. In embodiments wherein an object is accessed by a native application stored and executed on client device 134, where the object is in a designated location of the file system of client device 134 such that the object is managed by client application 136, the native application may not provide any native way to display the above addressed collaboration data. In such embodiments, client collaboration service 140 can detect that a subject has opened an object, and can provide an overlay with additional information for the object, such as collaboration data. For example, the additional information can include comments for the object, status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage 124 via an application programming interface (API) on behalf of a subject. For example, a software package such as an application running on client device 134, can programmatically make API calls directly to content management system 102 when a subject provides authentication credentials, to read, write, create, delete, share, or otherwise manipulate content.

A subject can view or manipulate content stored in a subject account via a web interface generated and served by web interface service 110. For example, the subject can navigate in a web browser to a web address provided by content management system 102. Changes or updates to content in the object storage 124 made through the web interface, such as uploading a new version of an object, can be propagated back to other client devices associated with the subject's account. For example, multiple client devices, each with their own client software, can be associated with a single account and objects in the account can be synchronized between each of the multiple client devices.

Client device 134 can connect to content management system 102 on behalf of a subject. A subject can directly interact with client device 134, for example when client device 134 is a desktop or laptop computer, phone, television, internet-of-things device, etc. Alternatively or additionally, client device 134 can act on behalf of the subject without the subject having physical access to client device 134, for example when client device 134 is a server.

Some features of client device 134 are enabled by an application installed on client device 134. In some embodiments, the application can include a content management system specific component. For example, the content management system specific component can be a stand-alone client application 136, one or more application plug-ins, and/or a browser extension. However, the subject can also interact with content management system 102 via a third-party application, such as a web browser, that resides on client device 134 and is configured to communicate with content management system 102. In various implementations, the client application 136 can present a subject interface (UI) for a subject to interact with content management system 102. For example, the subject can interact with the content management system 102 via a file system explorer integrated with the file system or via a webpage displayed using a web browser application.

In some embodiments, client application 136 can be configured to manage and synchronize content for more than one account of content management system 102. In such embodiments client application 136 can remain logged into multiple accounts and provide normal services for the multiple accounts. In some embodiments, each account can appear as folder in a file system, and all objects within that folder can be synchronized with content management system 102. In some embodiments, client application 136 can include a selector to choose one of the multiple accounts to be the primary account or default account.

Third Party Services

In some embodiments content management system 102 can include functionality to interface with one or more third party services such as workspace services, email services, task services, etc. In such embodiments, content management system 102 can be provided with login credentials for a subject account at the third party service to interact with the third party service to bring functionality or data from those third party services into various subject interfaces provided by content management system 102.

While content management system 102 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
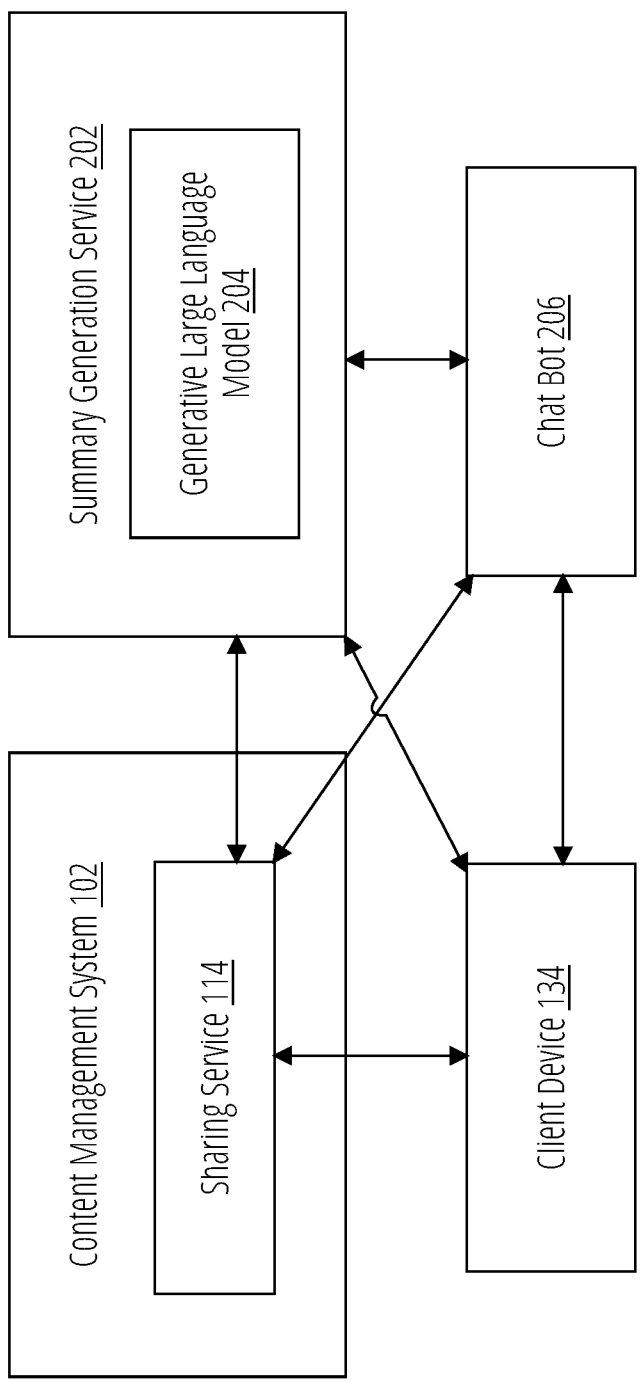
FIG. 2 illustrates an example system including the sharing service and a summary generation service for carrying out some aspects of the present technology.

FIG. 2 illustrates an example system including the sharing service 114 and a summary generation service 202 for carrying out some aspects of the present technology. While FIG. 2 is presented with specific components, they represent one possible configuration and that other configurations with more or fewer components are possible. Further, a service can have more or less functionality, even including functionality described as being with another service. Moreover, features described herein with respect to an embodiment can be combined with features described with respect to another embodiment.

As addressed above, the present technology addresses a need in the art for providing additional context to a recipient receiving a shared object(s). Generally, messages provided with shared objects are limited to a brief statement indicating that a user account has shared the object(s). Too often the recipient user has little context for what object has been shared, and might even ignore the sharing notification if the recipient does not appreciate the context for the sharing and does not appreciate what has been shared. The present technology can automatically create a summary for an object(s) to be shared to provide a recipient with greater context for the objects that have been shared with them.

As used herein, the term user account refers to a digital identity of a user that does not need to be associated with the content management system 102. This can include, for example, an email address for an email service, or a user identifier for an account at the content management system 102, etc.

FIG. 2 illustrates the summary generation service 202 for providing generated summaries to accompany sharing notifications. The summary generation service 202 can be part of the content management system 102 or can be a separate service accessible via an API. As will be addressed further herein, the summary generation service 202 can receive objects to be shared and can provide summaries of those objects. Additionally, the summary generation service can receive contextual information about the sharing such as information about the recipients of the sharing, the sender of the objects to be shared, and the particular permissions associated with the sharing of the objects. The summary generation service 202 can use this information to generate a summary that can provide context to recipients about the objects being shared with them.

As illustrated in FIG. 2, in some embodiments the summary generation service 202 can utilize a generative large language model 204 to perform the summarization of the objects. The generative large language model 204 can be any such generative large language model. Some examples of well-known generative large language models include CHATGPT by OPENAI and LAMDA by GOOGLE. In some embodiments, a user account can select their favored generative large language model to utilize with the present technology.

FIG. 2 also illustrates a chat bot 206 that can be provided by the content management system 102, the summary generation service 202, or can be a standalone service capable of interacting with the sharing service 114 and the summary generation service 202. As will be addressed further herein, the chat bot 206 can be an interface that a user uses to initiate sharing of an object through interfacing with sharing service 114, or a user can initiate sharing by interacting with a sharing service 114 and can interface with the chat bot 206 in order to provide additional instructions to the summary generation service 202.

Figure 3:
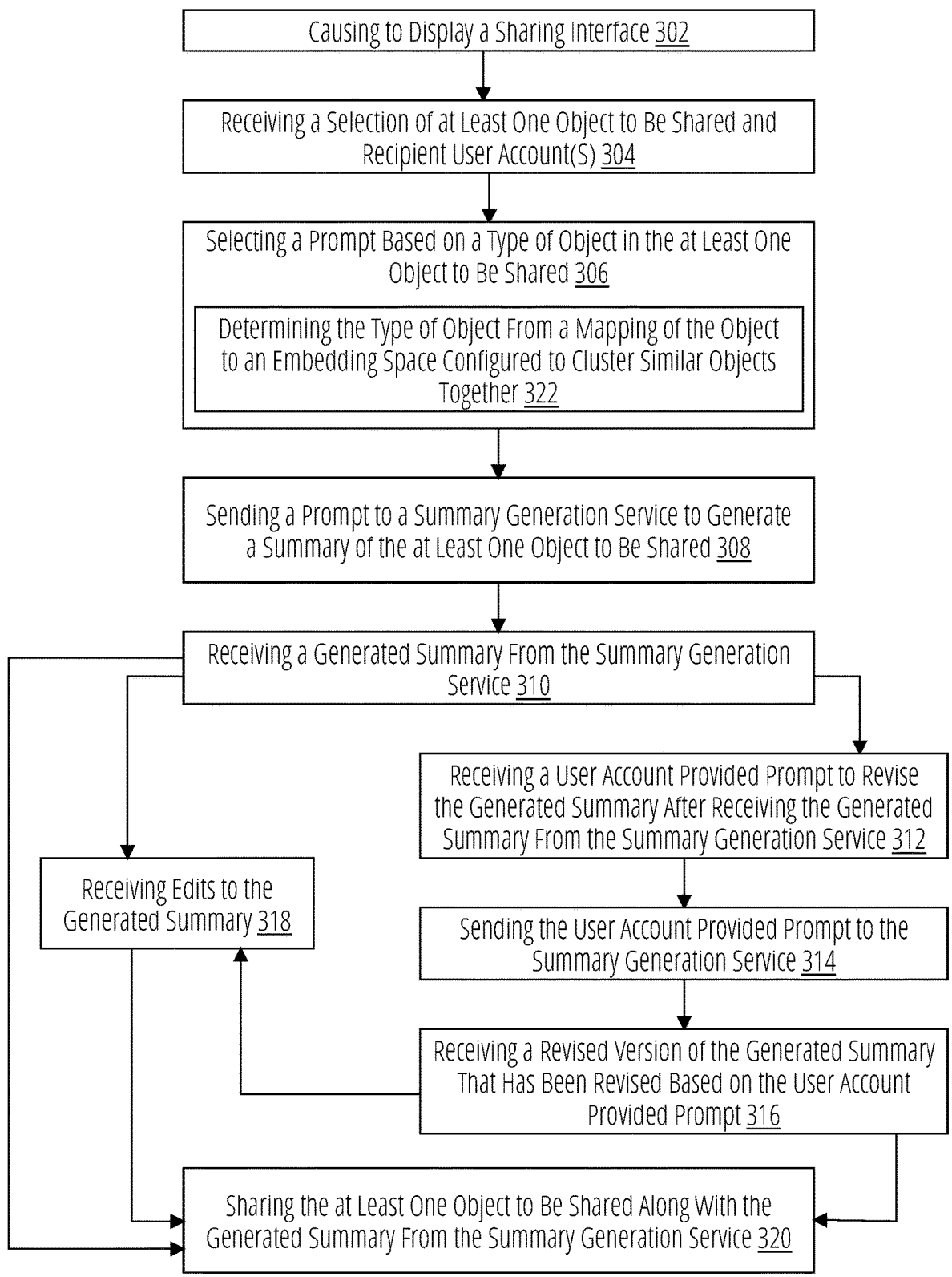
FIG. 3 illustrates an example routine for automatically generating a summary of objects being shared for inclusion in an object sharing notification in accordance with some aspects of the present technology.

FIG. 2 also illustrates multiple possible routes of interaction. One route is that the sharing service 114 can provide interfaces to be displayed on client devices 134, and the sharing service 114 can be an intermediary relaying messages between the interfaces displayed on the client device and the summary generation service 202. Another route is that the client device 134 that is displaying the sharing interfaces provided by the sharing service 114 can directly interact with the summary generation service 202. Although FIG. 3 makes reference to actions by the sharing service 114, it will be appreciated by those or ordinary skill that these actions can be occurring through the sharing service 114 at the content management system 102 or through the interfaces provided by the sharing service 114 at the client device 134. FIG. 3 is intended to cover embodiments wherein the sharing service 114 is an intermediary with the summary generation service 202 and embodiments wherein the client device 134 communicates directly with the summary generation service 202.

More details regarding FIG. 2 will be become apparent through a discussion of FIG. 3.

FIG. 3 illustrates an example routine for automatically generating a summary of objects being shared for inclusion in an object sharing notification in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

As addressed herein, the present technology provides a user interface that is part of a sharing process for the creation of the summary so that the creation of the summary is very convenient for the user, and can even be completely automatic.

According to some examples, the method includes causing the display of a sharing interface at block 302. For example, the sharing service 114 illustrated in FIG. 1 may include a sharing interface to be displayed on the client device 134. The sharing interface can be displayed by the client application 136 or a webpage rendered by a web browser executing on the client device 134.

According to some examples, the method includes receiving a selection of at least one object to be shared and recipient user account(s) at block 304. For example, the sharing service 114 illustrated in FIG. 1 may receive, via the sharing interface, a selection of at least one object to be shared and recipient user account(s).

The sharing interface can take any of several different forms, but all forms of the sharing interface include an option to include a summary of at least one object to be shared. One type of sharing interface is an explicit sharing UI that can be presented when a sharing user account has indicated an object(s) to be shared and at least one recipient user account and respective permissions to the objects(s). In some embodiments, the explicit type of sharing interface can include a selectable option to request that a sharing summary be created to be generated. In some embodiments, the explicit type of sharing interface can automatically generate a sharing summary.

Another type of sharing interface is a chat bot UI wherein a sharing user account can interact with the chat bot 206 to indicate an object(s) to be shared and at least one recipient user account and respective permissions to the objects(s). The user account can also ask the chat bot 206 to prepare a sharing summary, or the chat bot can automatically request the sharing summary.

The sharing interface can be an "in-band" sharing interface wherein an object(s) is shared through the content management system 102 when the sharing user account identifies recipient user accounts to receive access to the object(s), or the sharing interface can be an "out-of-band" sharing interface wherein the object(s) are shared through a link generated by the content management system 102 that is provided to the recipient user accounts outside of the 102. In some embodiments, the out-of-band sharing can be facilitated by an operating system of a client device, wherein the operating system is configured to select an app in which the link and summary should be shared and can assist in copying the link and summary into the selected app.

As introduced above, the present technology includes carefully engineered prompts that result in summaries that are appropriate for the object type and the sharing context in which the summary is intended. These prompts are designed and tested to produce acceptable summaries for the object type, and thereby reduce the need for follow-up prompts requesting revisions of the generated summary, though the sharing user account can request revisions or edit the summaries manually if they wish. Each prompt made to the summary generation service can result in a lot of computing resources being consumed by the summary generation service, especially, when the summary generation service utilizes a generative large language model to generate the summaries. Therefore, the present technology makes the summary generation service more efficient by providing carefully engineered prompts that are designed to result in less calls to the summary generation service.

According to some examples, the method includes selecting a prompt based on a type of object in at least one object to be shared at block 306. For example, the sharing service 114 illustrated in FIG. 1 may select a prompt based on a type of object in at least one object to be shared. As will be addressed further, generally instructing a summary generation service to generate a summary of an object might not produce an acceptable summary because there can be many ways to summarize an object. For example, the summary generation service would need to determine if the request wants a summary of the content of the object, or the characteristics (like the metadata and file type) of the object. Additionally, even instructing the summary generation service to provide a summary of the content of the object might not yield an acceptable summary for some object types. For this reason, prompt variants can exist for different object types.

According to some examples, the selection of the prompt can include determining the type of object from a mapping of the object to an embedding space configured to cluster similar objects together at block 322. For example, the sharing service 114 can use a clustering algorithm or machine learning algorithm that is configured to represent objects as vectors that can be placed into an embedding space. The vectors that are closer together in the embedding space can represent objects that are similar. That is, objects that are similar according to the clustering algorithm will result in vectors that are similar. And the vectors that are similar can be arranged proximate to other similar vectors in the embedding space. In some embodiments, clusters of vectors (objects) can be identified and maybe mapped to semantic labels characterizing the type of objects that are found in the cluster. The selection of a prompt can be based on a relationship between the first cluster to which the object is mapped and the prompt.

The clustering technique is just one example of how a type of object can be mapped to a prompt. Another technique can be to utilize a classifier algorithm to classify the object into a classification, where the classifications can be mapped to a prompt variant.

In an example of a prompt variant, when at least one object to be shared is a collection of objects, the prompt can be configured to request summaries of the objects in the collection of objects and then a summary of the summaries of the objects. In fact, when there is a collection of objects, the prompt might rely on a collection of prompts that correspond to the different object types.

In another example, when the object is a photo or image the prompt requests a summary that describes what is in the photo or image.

In another example, when the object is a novel, the prompt requests a summary of the narrative, or when the object is a textbook, the prompt requests a summary of chapters.

While there can be prompt variants that are configured for different object types, some prompt characteristics can be consistent amongst the prompt variants. For example, the prompts generally include guidance regarding an audience context and the desired length of the summary. For example, the prompt can request the summary for a reader that doesn't know what is in the at least one object to be shared. The prompt can request the summary to be less than 50 words or 2-3 sentences or a paragraph. The prompt can include guidance to inform a recipient of sharing information including at least one of a permission granted to the recipient user account and audience information pertaining to other user accounts that have access to the object.

There can also be user-specific prompt variants. A given sending user account might have a preference for a modified prompt variant that can be merged with the prompts that correspond to different object types.

According to some examples, the method includes sending the prompt, by the sharing service 114, to a summary generation service 202 to generate a summary of the at least one object to be shared at block 308. In some embodiments, the summary generation service 202 can includes a generative large language model 204.

The sending of the prompt also includes making at least a portion of the at least one object to be shared available to the summary generation service 202. The summary generation service 202 can receive access to at least one object to be shared via an API to the content management system or by receiving at least the portion of at least one object to be shared from the sharing service 114.

According to some examples, the method includes receiving a generated summary from the summary generation service at block 310. For example, the sharing service 114, can receive the generated summary from the summary generation service. In some embodiments, the sharing service 114 can receive portions of the generated summary as it is being generated and can display the portions in the sharing interface.

While the prompts are designed to produce acceptable generated summaries, the sending user account might want to revise the generated summary. Accordingly, the method includes receiving a user account provided prompt to revise the generated summary after receiving the generated summary from the generative large language model at block 312. For example, the sending user account can interact with the chat bot 206 to provide a prompt to revise the generated summary.

Note that in this example, the chat bot 206 might be the same or might be different than the chat bot referred to with respect to block 304. For example, the content management system 102 might utilize a chat bot 206 to make it easier or more convenient to utilize some functions or services of the content management system 102. At the same time, the summary generation service might utilize its own chat bot 206, such as is the case when interacting with the generative large language model CHATGPT provided by OPEN AI. Although FIG. 2 illustrates just one instance of the chat bot 206, those of ordinary skill in the art will appreciate that there can be two or more chat bots.

According to some examples, the method includes sending the user account provided prompt to the summary generation service at block 314. For example, the chat bot 206 can receive the prompt and send it to the summary generation service 202.

According to some examples, the method includes receiving a revised version of the generated summary that has been revised based on the user account provided prompt at block 316.

According to some examples, the sending user account can also review and manually revise the generated summary, including the generated summary at block 318. As illustrated in FIG. 3, the receipt of the sending user account provided edits can be received in alternative to the revised prompt-related blocks of 312, 314, and 316 or can be in addition to these.

The sending user account is ultimately responsible for reviewing the generated summary before the sharing message is sent to the recipient user accounts. Accordingly, the sending user account can interact with the sharing interface to review and revise the generated summary. The generated summary is included in a sharing note. The sharing note can include a templatized portion and the generated summary. The templatized portion can include sharing information such as at least one of permission granted to the recipient user account and audience information pertaining to other user accounts that have access to the object. In some embodiments, the prompt to the summary generation service might instruct the summary generation service to include the contents of the templatized portion in the generated summary which can obviate the need to reproduce the templatized portion.

Once the sending user account finds the sharing note acceptable, the method includes sharing at least one object to be shared along with the generated summary from the summary generation service at block 320. For example, the sending user account can select an option in the sharing interface to send the sharing note which can cause the sharing service 114 to send the sharing note and provide access to the shared object(s) to the recipient user account(s). As an alternative to the selection of the option, the sending user account can interact with a chat bot 206 to cause the sharing note to be sent as well.

In the case of an out-of-band sharing mechanism, the sharing interface can provide an option to copy a link to the shared object(s) and to copy the sharing note including the generated summary. The user account can then paste the link and the sharing note into an out-of-band communication platform to send the sharing note and link to the recipient user account(s). In some embodiments, the out-of-band sharing can be facilitated by an operating system of a client device, wherein the operating system is configured to select an app in which the link and summary should be shared and can assist in copying the link and summary into the selected app.

Figure 4A:
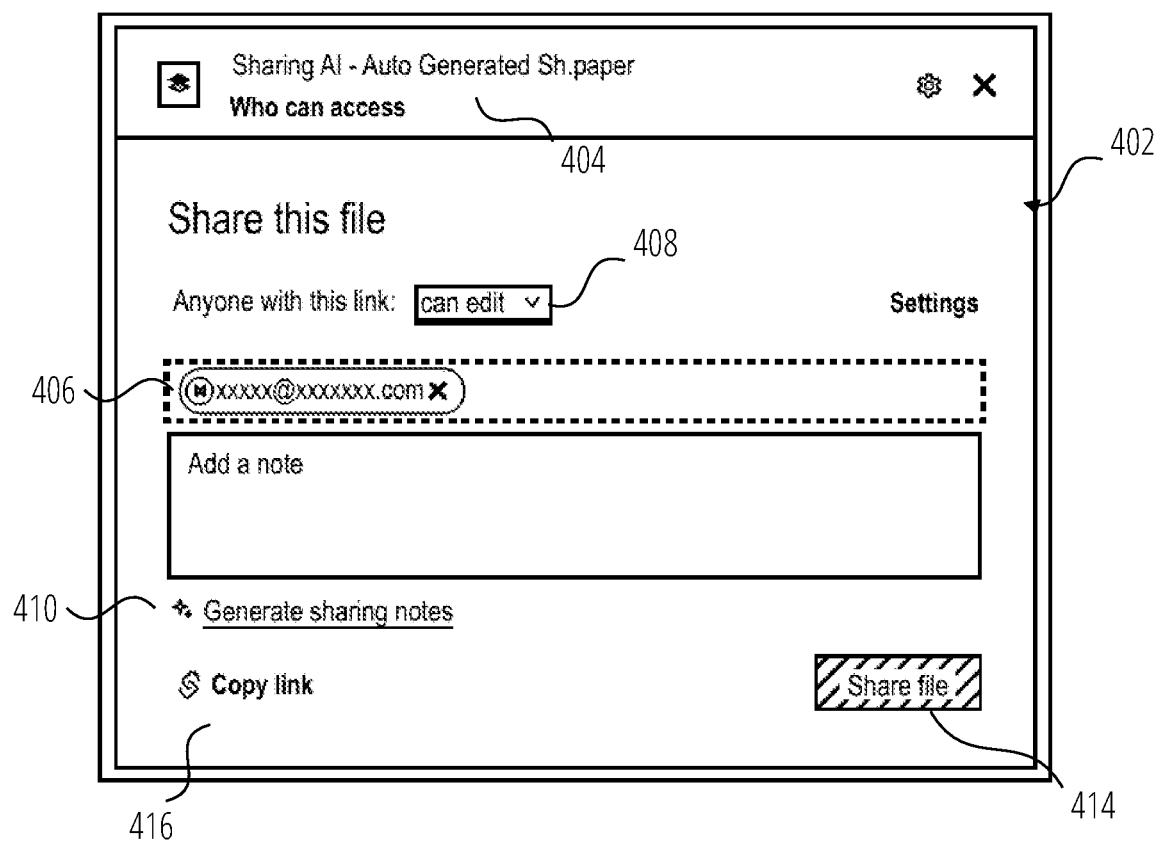
FIG. 4A and FIG. 4B illustrate an example sharing interface in accordance with some aspects of the present technology.
Figure 4B:
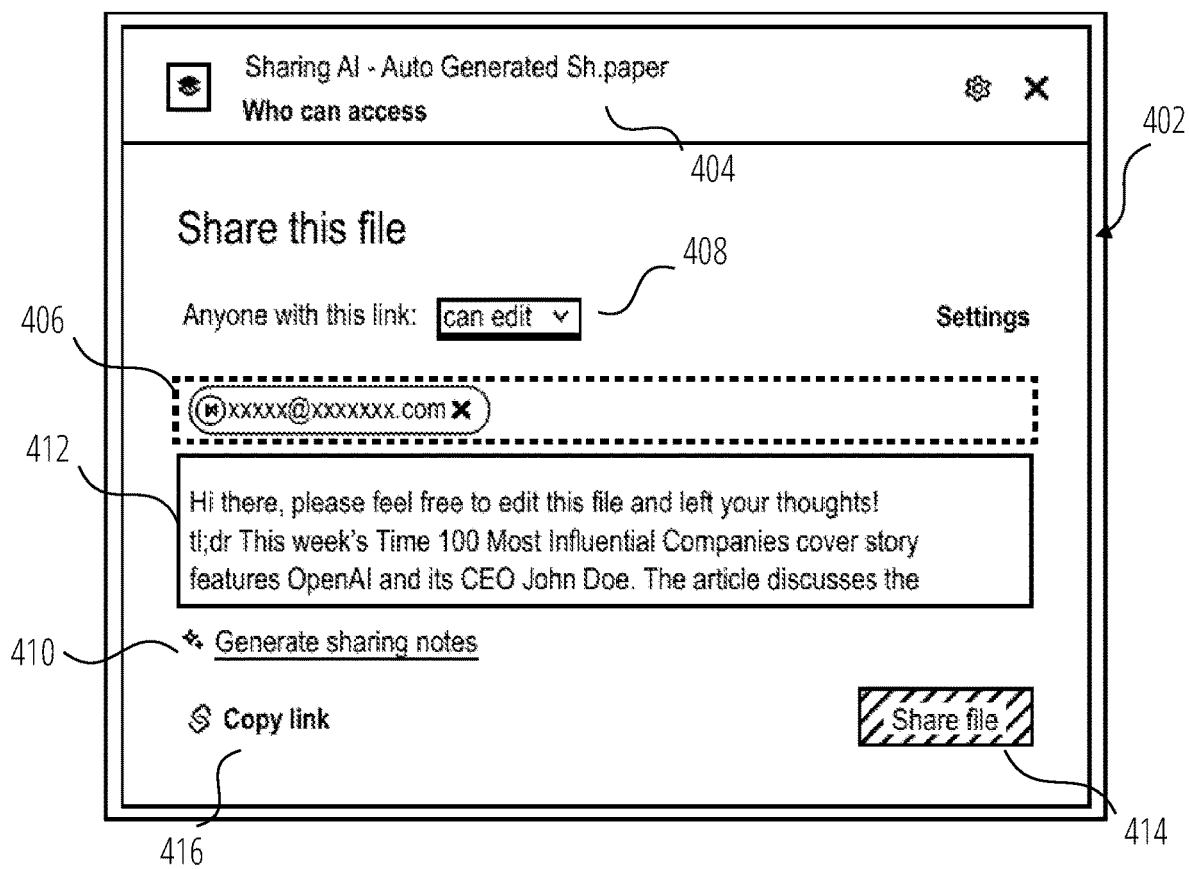

FIG. 4A and FIG. 4B illustrates an example sharing interface in accordance with some aspects of the present technology.

For example, FIG. 4A and FIG. 4B illustrates sharing interface 402. A sending user account can interact with the sharing interface 402 to select at least one object to be shared 404, at least one recipient user account 406. The sending user can also configure sharing privileges for the recipient user account(s) to access and/or edit at least one object to be shared through interacting with the permissions selection 408.

Additionally, the sharing interface 402 includes a summary generation option 410, which, when selected by the sending user account, can cause the sharing service 114 to perform steps associated with block 306, block 308, and block 310, as addressed above, to result in the generated summary 412 illustrated in FIG. 4B.

Once the sending user account finds the generated summary to be acceptable the sending user account can interact with sharing button 414 to share the at least one object to be shared along with a sharing note including the generated summary via an in-band sharing mechanism, or the sending user account can interact with sharing link copy option 416 to copy a link to the at least one object to be shared and the sharing note including the generated summary via an out-of-band messaging system.

As illustrated in FIG. 4A and FIG. 4B the creation of a summary for inclusion in a sharing note becomes mostly frictionless. The present technology can automatically create a summary for an object(s) to be shared. Moreover, the present technology provides a user interface that is part of a sharing process for the creation of the summary so that the creation of the summary is very convenient for the user, and can even be completely automatic.

Figure 5A:
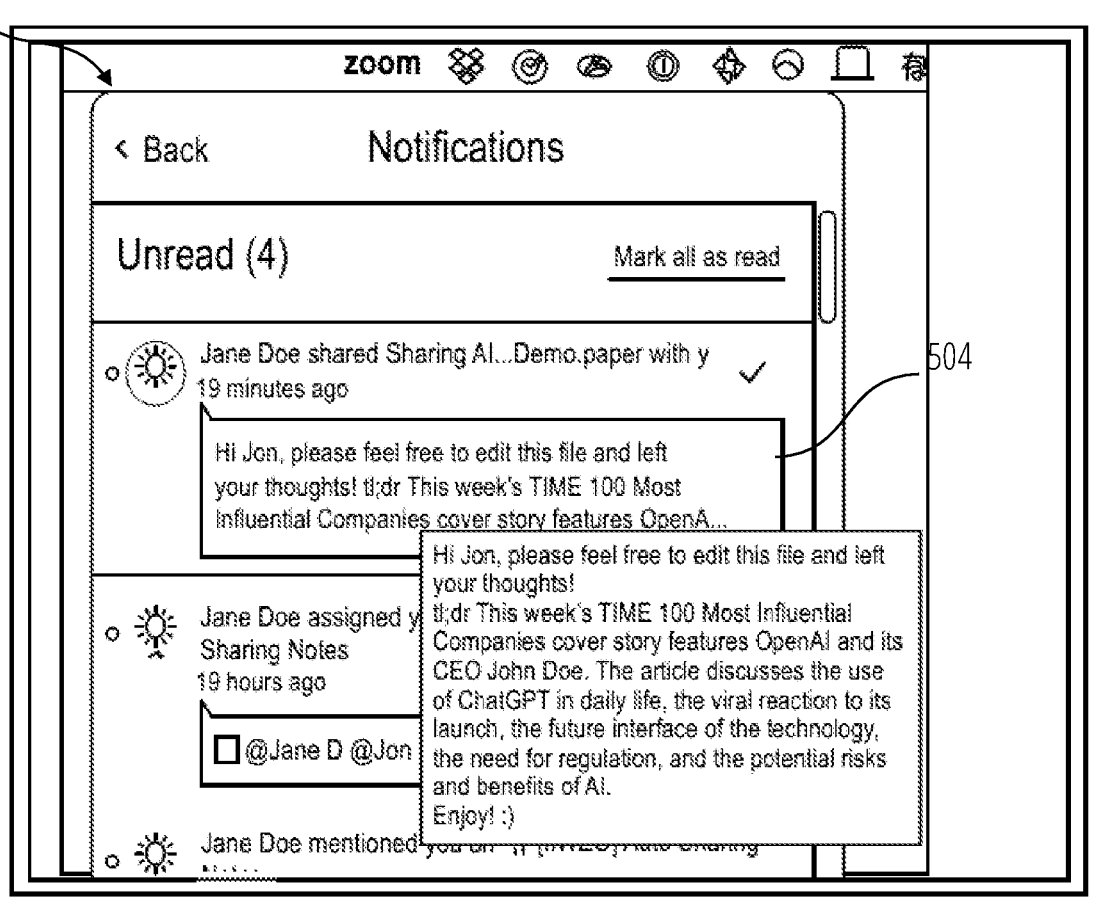
FIG. 5A, FIG. 5B, and FIG. 5C illustrate varieties of messaging interfaces to inform a recipient user account about at least one object to be shared in accordance with some aspects of the present technology.
Figure 5B:
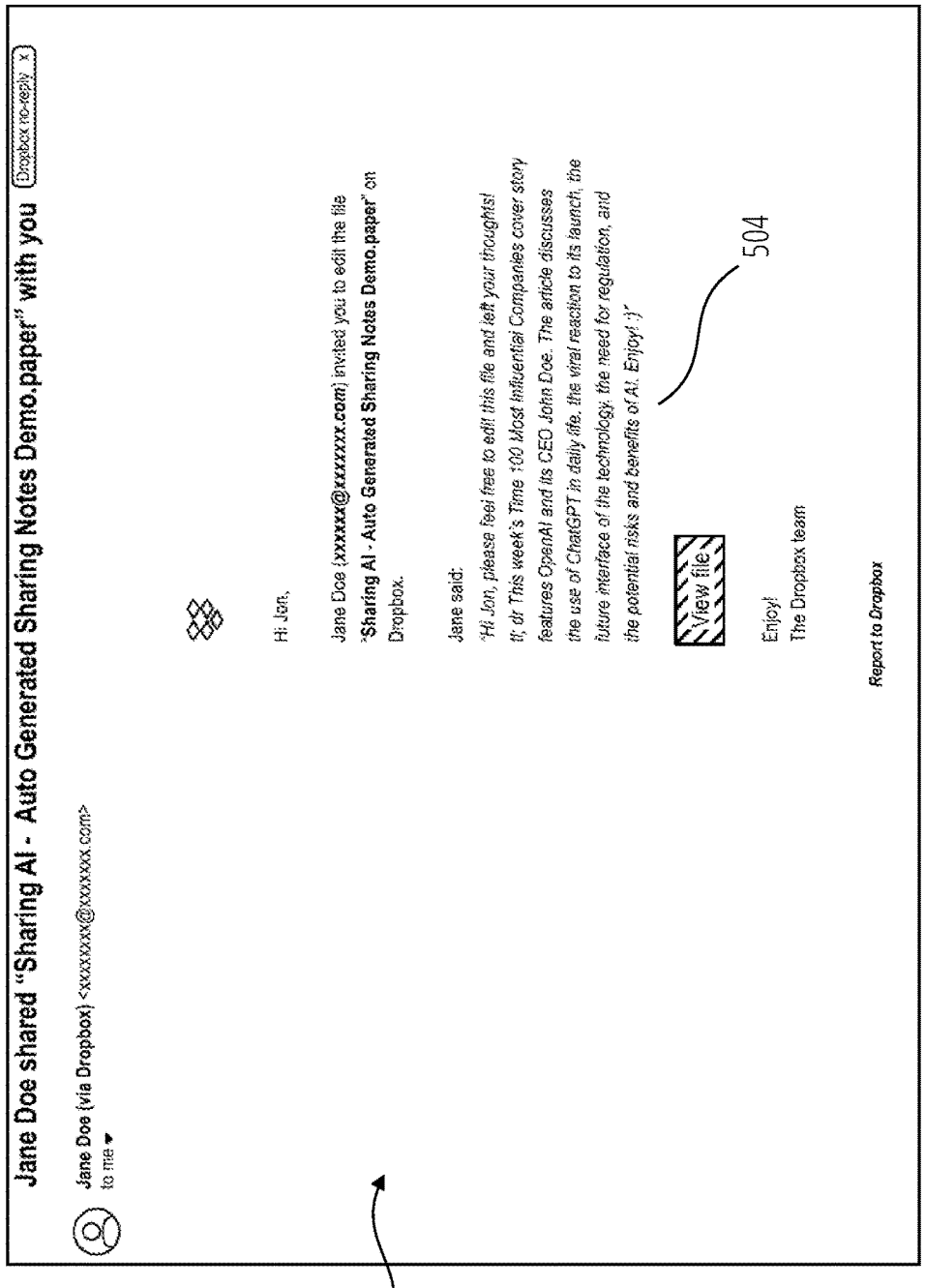
Figure 5C:
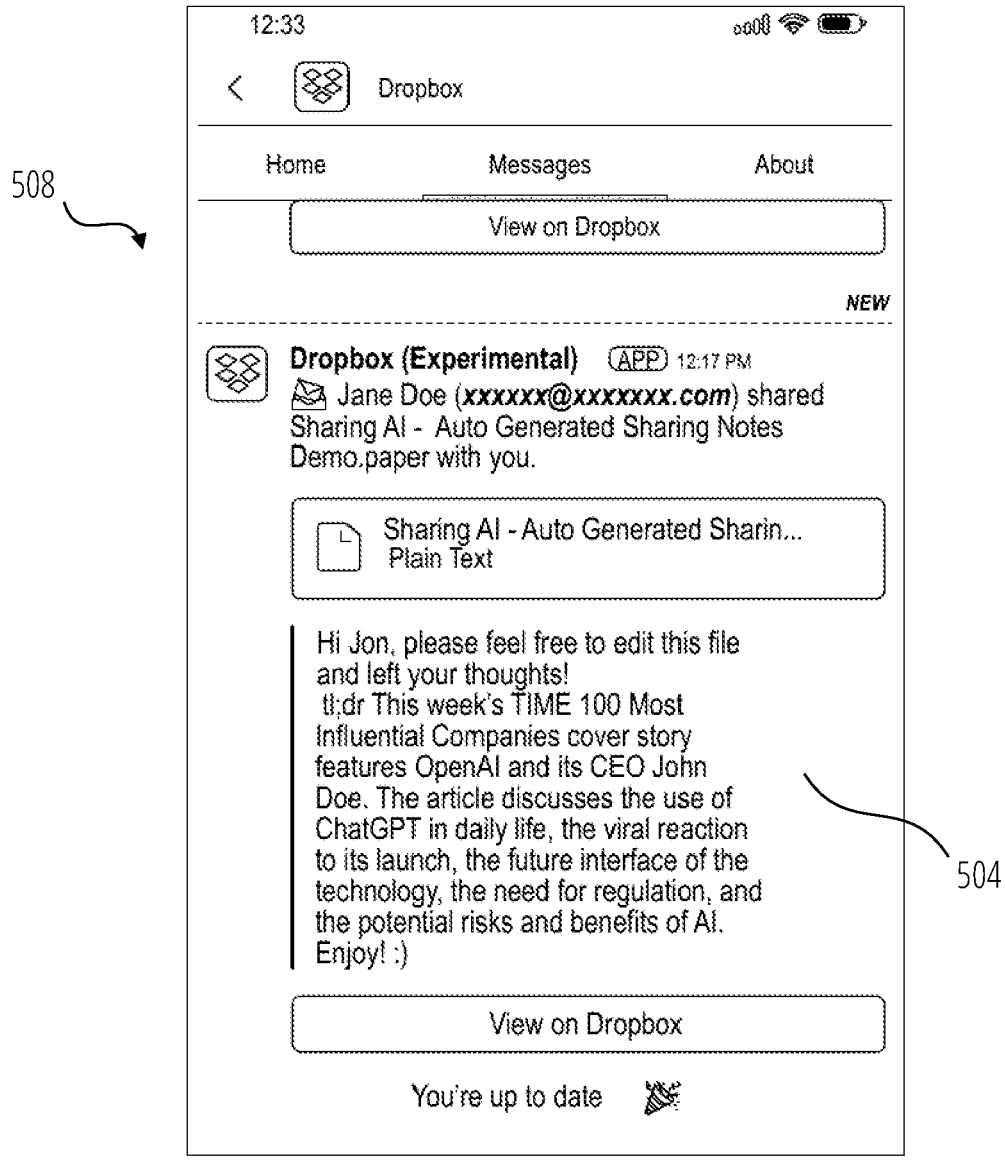

FIG. 5A, FIG. 5B, and FIG. 5C illustrates varieties of messaging interfaces to inform a recipient user account about at least one object to be shared in accordance with some aspects of the present technology.

For example, FIG. 5A illustrates an example notifications feed 502, FIG. 5B illustrates an example email interface 506, and FIG. 5C illustrates an example messages interface 508. All three examples show a sharing note including the generated summary 504 directed at the recipient user account. The sharing note including the generated summary 504 includes an indication of at least one object to be shared, the privileges that the recipient user account has received to at least one object to be shared, and the generated summary that can provide context to the recipient user account about the at least one object to be shared.

Figure 6A:
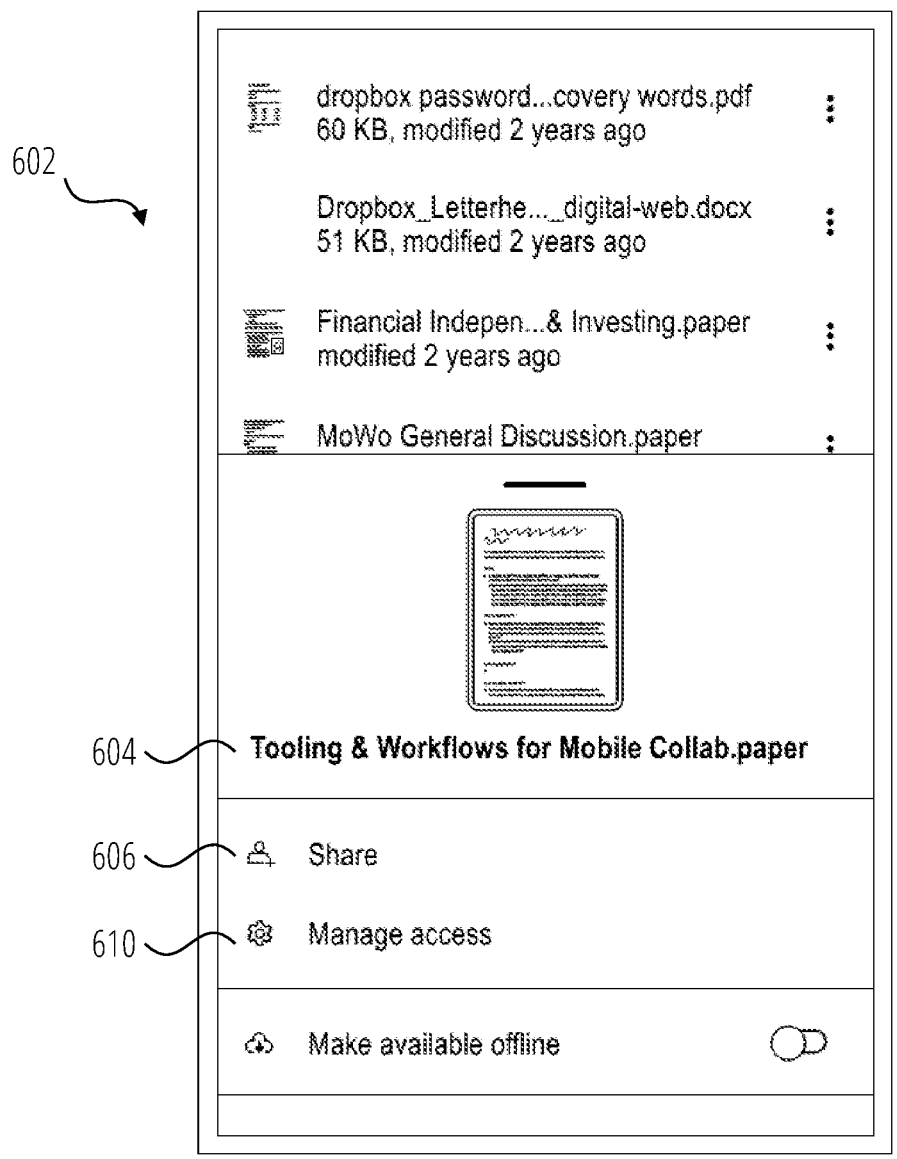
FIG. 6A and FIG. 6B illustrate an example mobile sharing interface in accordance with some aspects of the present technology.
Figure 6B:
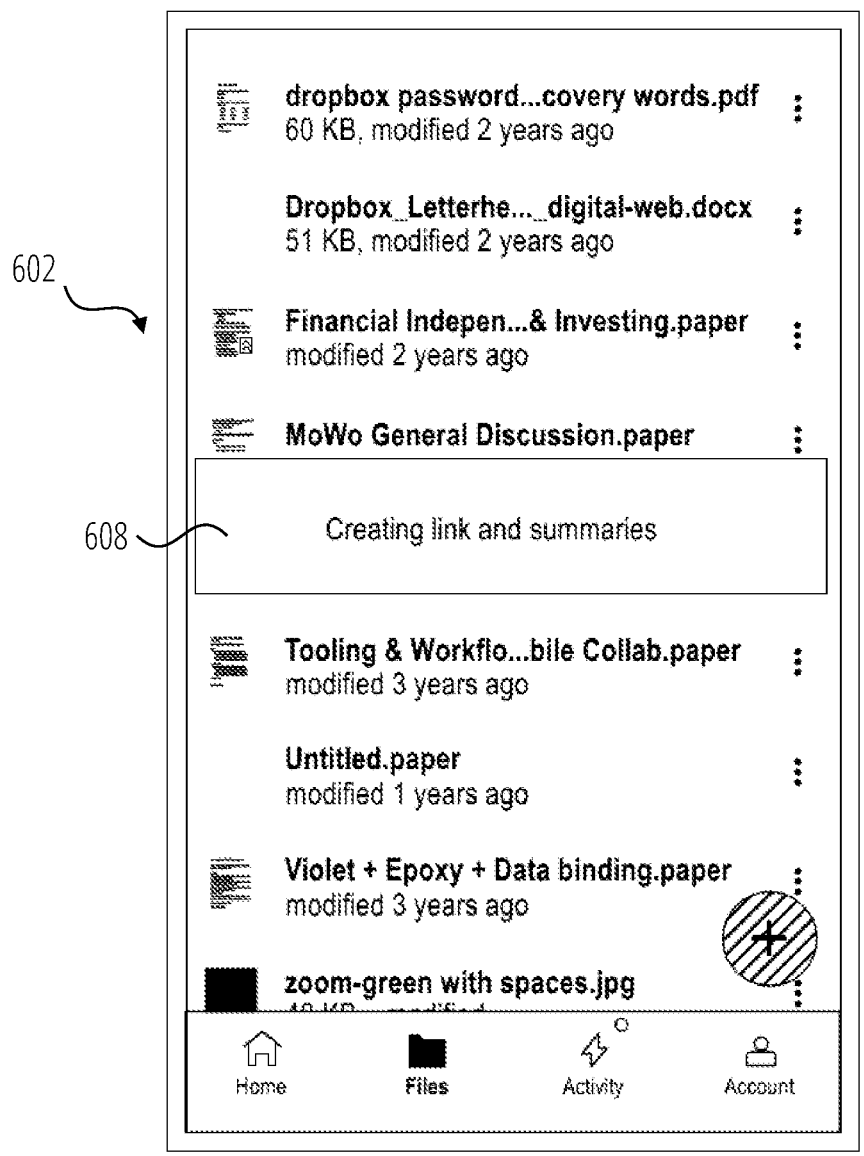

FIG. 6A and FIG. 6B illustrates an example mobile sharing interface in accordance with some aspects of the present technology.

For example, FIG. 6A and FIG. 6B illustrates mobile sharing interface 602. A sending user account can interact with the mobile sharing interface 602 to select at least one object to be shared 604. In this embodiment, the mobile sharing interface 602 is configured for out-of-band sharing, and as such, the sharing button 606 is configured to provide a sharing link and a sharing note to be pasted into a messaging interface. The sending user can also configure sharing privileges for the recipient user account(s) to access and/or edit the at least one object to be shared through interacting with the permissions selection 610.

FIG. 6B shows an interface that is presented as a result of selection of the sharing button 606. When the sending user account selects the sharing button 606 this causes the sharing service 114 to perform steps associated with block 306, block 308, and block 310 as addressed above to result in a generated summary. While the summary generation service prepares the summary, the mobile sharing interface 602 can present a summary generation status message 608.

Unlike the embodiment illustrated in FIG. 4A and FIG. 4B, the sending user account does not get to see the generated summary prior to the generated summary being copied for out-of-band sharing. Instead, the sharing link and sharing note can be automatically copied to a clipboard for sharing as illustrated in FIG. 7.

Figure 7:
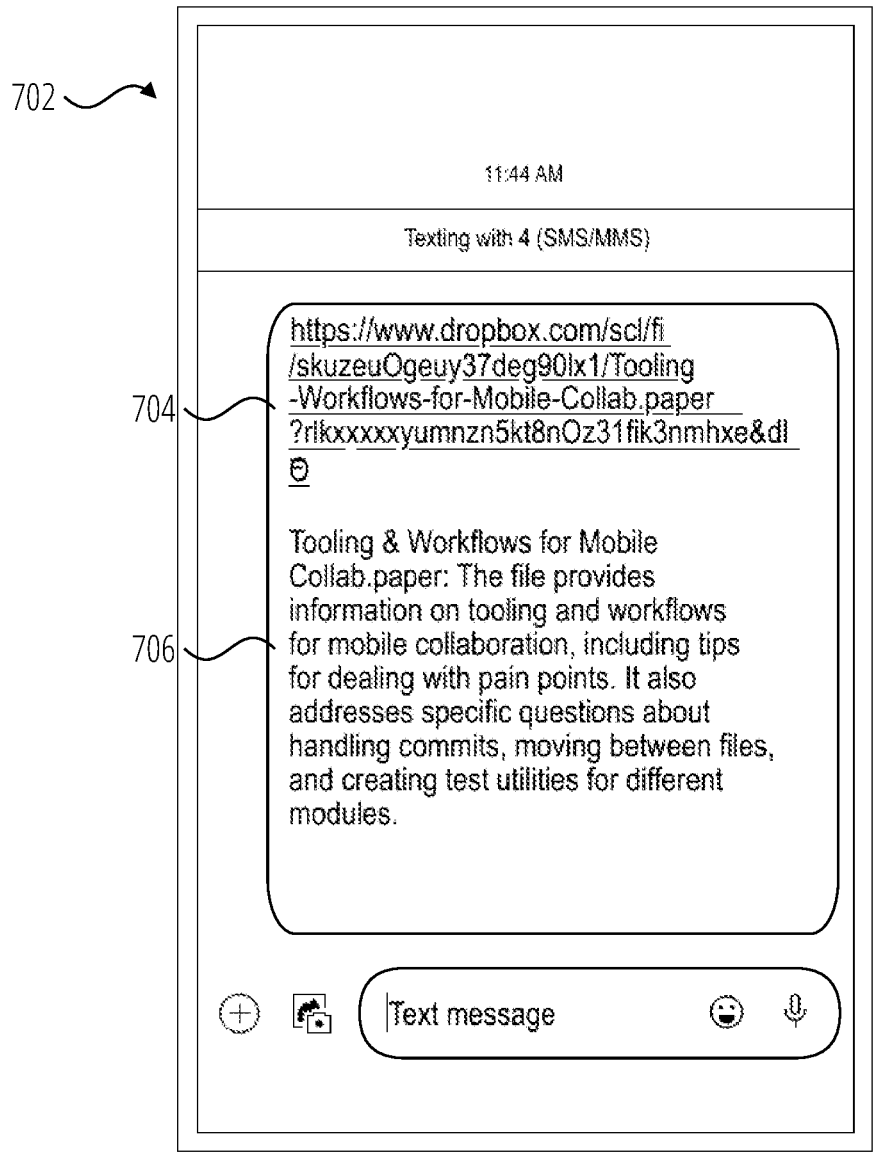
FIG. 7 illustrates a mobile messaging interface for use to inform a recipient user account about the at least one object to be shared in accordance with some aspects of the present technology.

FIG. 7 illustrates a mobile messaging interface for use to inform a recipient user account about at least one object to be shared in accordance with some aspects of the present technology.

Since a mobile device can be characterized as requiring slightly more effort to switch between apps, such as the client application 136 and a messaging application, the mobile device sharing flow can automatically copy the sharing link 704 and the generated summary 706 once the generated summary is completed.

This design choice may require that the sending user account revise the sharing note in the mobile messaging interface 702, but the sending user account still maintains that option.

While the mobile sharing embodiments described in FIG. 6A, FIG. 6B, and FIG. 7 automatically generate a summary and automatically paste the sharing note into a message to inform the recipient user account of the sharing, persons of ordinary skill in the art will appreciate that this is merely a design choice and is not a required process. The mobile sharing flow can be configured to operate more like the embodiments addressed in FIG. 4A, FIG. 4B, FIG. 5A, FIG. 5B, and FIG. 5C. Likewise, the embodiments addressed in FIG. 4A, FIG. 4B, FIG. 5A, FIG. 5B, and FIG. 5C can be configured to automatically copy the sharing note and/or sharing link in a process more similar to that depicted in FIG. 6A, FIG. 6B, and FIG. 7.

As illustrated in FIG. 6A, FIG. 6B, and FIG. 7, the creation of a summary for inclusion in a sharing note becomes mostly frictionless. The present technology can automatically create a summary for an object(s) to be shared. Moreover, the present technology provides a user interface that is part of a sharing process for the creation of the summary so that the creation of the summary is very convenient for the user, and can even be completely automatic.

Figure 8:
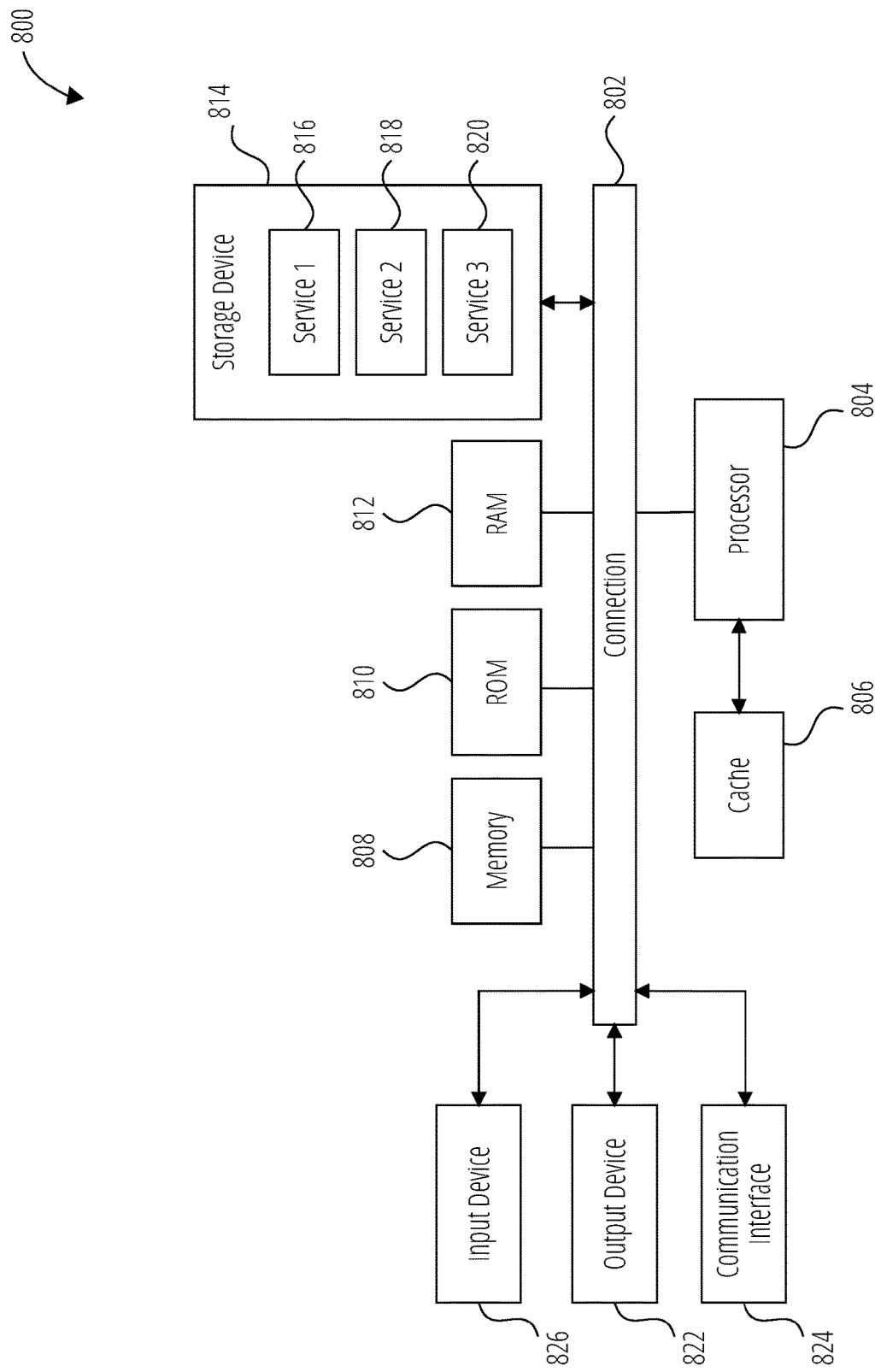
FIG. 8 illustrates a system for carrying out some aspects of the subject matter of the present technology.

FIG. 8 shows an example of computing system 800, which can be for example any computing device making up content management system 102 or client devices 134, or any component thereof in which the components of the system are in communication with each other using connection 802. Connection 802 can be a physical connection via a bus, or a direct connection into processor 804, such as in a chipset architecture. Connection 802 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 800 includes at least one processing unit (CPU or processor) 804 and connection 802 that couples various system components including system memory 808, such as read-only memory (ROM) 810 and random access memory (RAM) 812 to processor 804. Computing system 800 can include a cache of high-speed memory 808 connected directly with, in close proximity to, or integrated as part of processor 804.

Processor 804 can include any general purpose processor and a hardware service or software service, such as services 806, 818, and 820 stored in storage device 814, configured to control processor 804 as well as a special-purpose processor where software instructions are incorporated into the actual processor design. Processor 804 may essentially be a completely self-contained computing system, containing multiple cores or processors, a bus, memory controller, cache, etc. A multi-core processor may be symmetric or asymmetric.

To enable user interaction, computing system 800 includes an input device 826, which can represent any number of input mechanisms, such as a microphone for speech, a touch-sensitive screen for gesture or graphical input, keyboard, mouse, motion input, speech, etc. Computing system 800 can also include output device 822, which can be one or more of a number of output mechanisms known to those of skill in the art. In some instances, multimodal systems can enable a user to provide multiple types of input/output to communicate with computing system 800. Computing system 800 can include communication interface 824, which can generally govern and manage the user input and system output. There is no restriction on operating on any particular hardware arrangement, and therefore the basic features here may easily be substituted for improved hardware or firmware arrangements as they are developed.

Storage device 814 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 814 can include software services, servers, services, etc., that when the code that defines such software is executed by the processor 804, it causes the system to perform a function. In some embodiments, a hardware service that performs a particular function can include the software component stored in a computer-readable medium in connection with the hardware components, such as processor 804, connection 802, output device 822, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

The present technology includes computer-readable storage mediums for storing instructions, and systems for executing any one of the methods embodied in the instructions addressed in the aspects of the present technology presented below:

Aspect 1. A method of automatically generating a summary of objects being shared for inclusion in an object sharing notification, the method comprising: causing to display, a sharing interface, the sharing interface including an option to include a summary of at least one object to be shared; sending a prompt to a summary generation service to generate a summary of the at least one object to be shared, wherein the sending the prompt also includes making at least a portion of the at least one object to be shared available to the summary generation service; receiving a generated summary from the summary generation service; sharing the at least one object to be shared along with the generated summary from the summary generation service.

Aspect 2. The method of Aspect 1, wherein the option to include the summary of the at least one object to be shared includes an option to generate the summary, the method further comprising: receiving a selection of the option to generate a summary of the at least one object to be shared.

Aspect 3. The method of any of Aspects 1 to 2, wherein the generated summary is automatically prepared.

Aspect 4. The method of any of Aspects 1 to 3, further comprising: receiving an interaction with a chatbot, wherein the sending the prompt to the summary generation service is a result of the interaction with the chatbot.

Aspect 5. The method of any of Aspects 1 to 4, wherein the interaction with the chatbot specifies the at least one object to be shared and sharing information, the sharing information includes a permission granted to the recipient user account.

Aspect 6. The method of any of Aspects 1 to 5, wherein the prompt includes guidance regarding an audience context and a desired length of the summary, the prompt requests the summary for a reader that doesn't know what is in at least one object to be shared, the prompt request the summary to be less than 50 words or 2-3 sentences or a paragraph.

Aspect 7. The method of any of Aspects 1 to 6, further comprising: selecting a prompt based on a type of object in the at least one object to be shared, wherein when the at least one object to be shared is a collection of objects the prompt requests summaries of the objects in the collection of the objects and then a summary of the summaries of the objects, wherein when the object is a photo or image the prompt requests a summary that describes what is in the photo or image, wherein when the object is a novel the prompt requests a summary of the narrative, wherein when the objects is a textbook the prompt request a summary of chapters.

Aspect 8. The method of any of Aspects 1 to 7, further comprising: determining the type of object from a mapping of the object to an embedding space configured to cluster similar objects together, wherein the selection of the prompt is based on a relationship between a first cluster to which the object is mapped and the prompt, the prompt can be configured for a cluster.

Aspect 9. The method of any of Aspects 1 to 8, wherein the prompt includes guidance to inform a recipient of sharing information, the sharing information includes at least one of a permission granted to the recipient user account and audience information pertaining to other user accounts that have access to the object.

Aspect 10. The method of any of Aspects 1 to 9, wherein the generated summary is included in a sharing note, the sharing note including a templatized portion and the generated summary, wherein the templatized portion includes sharing information, the sharing information includes at least one of a permission granted to the recipient user account and audience information pertaining to other user accounts that have access to the object.

Aspect 11. The method of any of Aspects 1 to 10, wherein the generated summary is displayed as it is being generated.

Aspect 12. The method of any of Aspects 1 to 11, further comprising: receiving a user account provided prompt to revise the generated summary after receiving the generated summary from the summary generation service sending the user account provided prompt to the summary generation service; and receiving a revised version of the generated summary that has been revised based on the user account provided prompt.

Aspect 13. The method of any of Aspects 1 to 12, wherein the making the at least the portion of the at least one object to be shared available to the summary generation service includes providing access to the at least one object to be shared via an API to a content management system.

Aspect 14. The method of any of Aspects 1 to 13, wherein the making the at least the portion of the at least one object to be shared available to the summary generation service includes sending the at least the portion of the at least one object to be shared to the summary generation service.

What is claimed is:

1. A method comprising:
causing to display, a sharing interface, the sharing interface including an option to include a summary of at least one object to be shared;
sending a prompt to a summary generation service to generate the summary of the at least one object to be shared, wherein the sending the prompt includes making at least a portion of the at least one object to be shared available to the summary generation service, wherein the prompt is based on a type of object in the at least one object to be shared and the prompt includes guidance to inform a recipient of sharing information, the sharing information includes at least one of a permission granted to a recipient user account and audience information pertaining to other user accounts that have access to the at least one object;
receiving a generated summary from the summary generation service; and
sharing the at least one object to be shared along with the generated summary from the summary generation service.

2. The method of claim 1, further comprising:
receiving an interaction with a chatbot, wherein the sending the prompt to the summary generation service is a result of the interaction with the chatbot.

3. The method of claim 2, wherein the interaction with the chatbot specifies the at least one object to be shared and sharing information, the sharing information includes the permission granted to the recipient user account.

4. The method of claim 1, wherein the prompt includes guidance regarding an audience context or a desired length of the summary.

5. The method of claim 1, wherein the generated summary is included in a sharing note, the sharing note including a templatized portion and the generated summary, wherein the templatized portion includes sharing information, the sharing information includes at least one of the permission granted to a recipient user account and the audience information pertaining to other user accounts that have access to the at least one object.

6. The method of claim 1, further comprising:
receiving a user account provided prompt to revise the generated summary after receiving the generated summary from the summary generation service;
sending the user account provided prompt to the summary generation service; and
receiving a revised version of the generated summary that has been revised based on the user account provided prompt.

7. A computing system comprising:
at least one processor; and
a memory storing instructions that, when executed by the at least one processor, configure the system to:
cause to display, a sharing interface, the sharing interface including an option to include a summary of at least one object to be shared;
send a prompt to a summary generation service to generate the summary of the at least one object to be shared, wherein the sending the prompt includes making at least a portion of the at least one object to be shared available to the summary generation service, wherein the prompt is based on a type of object in the at least one object to be shared and the prompt includes guidance to inform a recipient of sharing information, the sharing information includes at least one of a permission granted to a recipient user account and audience information pertaining to other user accounts that have access to the at least one object;
receive a generated summary from the summary generation service; and
share the at least one object to be shared along with the generated summary from the summary generation service.

8. The computing system of claim 7, wherein the instructions further configure the system to:
receive an interaction with a chatbot, wherein the sending the prompt to the summary generation service is a result of the interaction with the chatbot.

9. The computing system of claim 8, wherein the interaction with the chatbot specifies the at least one object to be shared and sharing information, the sharing information includes the permission granted to the recipient user account.

10. The computing system of claim 7, wherein the prompt includes the guidance regarding an audience context or a desired length of the summary.

11. The computing system of claim 7, wherein the generated summary is included in a sharing note, the sharing note include a templatized portion and the generated summary, wherein the templatized portion includes sharing information, the sharing information includes at least one of the permission granted to a recipient user account and the audience information pertaining to other user accounts that have access to the at least one object.

12. The computing system of claim 7, wherein the instructions further configure the system to:
receive a user account provided prompt to revise the generated summary after receiving the generated summary from the summary generation service;
send the user account provided prompt to the summary generation service; and
receive a revised version of the generated summary that has been revised based on the user account provided prompt.

13. A non-transitory computer-readable storage medium, the computer-readable storage medium including instructions that when executed by at least one processor, cause a computer to:
cause to display, a sharing interface, the sharing interface including an option to include a summary of at least one object to be shared;
send a prompt to a summary generation service to generate the summary of the at least one object to be shared, wherein the sending the prompt includes making at least a portion of the at least one object to be shared available to the summary generation service, wherein the prompt is based on a type of object in the at least one object to be shared and the prompt includes guidance to inform a recipient of sharing information, the sharing information includes at least one of a permission granted to a recipient user account and audience information pertaining to other user accounts that have access to the at least one object;
receive a generated summary from the summary generation service; and
share the at least one object to be shared along with the generated summary from the summary generation service.

14. The computer-readable storage medium of claim 13, wherein the prompt includes the guidance regarding an audience context or a desired length of the summary.

15. The computer-readable storage medium of claim 13, wherein the generated summary is included in a sharing note, the sharing note include a templatized portion and the generated summary, wherein the templatized portion includes sharing information, the sharing information includes at least one of a permission granted to a recipient user account and audience information pertaining to other user accounts that have access to the at least one object.

* * * * *